Patented Aug. 11, 1936

2,051,003

UNITED STATES PATENT OFFICE 2,051,003

REFRACTORY MATERIAL AND METHOD OF MAKING SAME

John M. Knote, South River, N. J., assignor to Quigley Company, Inc., South River, N. J., a corporation of New York No Drawing. Application November 28, 1933, Serial No. 700,081

7 Claims. (Cl. 106—9)

This invention relates generally to the production of highly refractory materials for use in lining furnaces and for similar purposes.

Such materials may be employed in plastic form for application to furnace walls and bottoms where the mass is burned in situ by the furnace heat to form a monolithic lining for such furnace, as described and claimed in my prior application Ser. No. 648,644, filed December 23, 1930, of which this present application is a continuation in part; or may be made into refractory bricks, or fire bricks by the usual brick-making processes.

The main object of the invention is the production of such refractory masses, whether in the form of bricks or as monolithic linings, out of relatively cheap and plentiful raw materials by a simple, inexpensive process requiring only short periods of time for its completion; the product of the process being a high grade refractory having great ruggedness or hardness and ample strength, developing ability to withstand the chemical or physical erosive actions of molten metals and of common types of metallurgical slags.

The basic, underlying principle of the invention is the mixing together of the proper materials in substantially the necessary proportions such that when subjected to temperatures of from 2300 to 2700 degrees Fahrenheit, commonly prevailing in metallurgical furnaces, they will so combine as to form a refractory mass of the hereinbefore noted character which will not be easily deformed by pressure or by the impact of tools or other solid bodies.

Another important principle of the invention is the supplying of certain of the constituents needed to produce such a mass in the form of a minor proportion of an hydraulic cement which, after the materials have been wet up to form a plastic mass will set promptly and harden without the application of heat. This holds the molded masses, whether bricks or monolithic furnace linings, in their original shape before and during the preliminary heating or burning in furnace or kiln and prevents warping or shrinking of bricks or linings in the first stages of the heating or burning process. Also, when this preliminary step has been completed and the temperature has been raised to a degree which disintegrates the set cement, a pyro chemical reaction comes into play and continues to hold the masses in their original shapes, transforming them quite rapidly into dense, hard, refractory integral bodies which are ideal for the ultimate purpose of the entire operation.

I am aware that it has been heretofore proposed to include in a mix with standard refractory material a minor proportion (about 5% or 6%) of substances which will form a spinel under the action of the heat of the brick kiln or of the freshly lined furnaces, and which procedure was supposed to form films of spinel, encasing the otherwise unmodified particles of the main refractory material employed and thus serving as a binder for holding together such particles of the original, unchanged refractory which was to form the main body of the brick, or of the furnace lining; but such procedure has not resulted in commercial success, the ultimate product lacking the required strength and freedom from liability to be washed down by molten metal and slags, as well as developing other serious faults.

Furthermore, if the material suggested in such prior art disclosures had to be pressed into form before use (which was usually necessary) this required much labor and machinery, while if made into plastic masses by the addition of any ordinary agglutinant, any binding action of the latter was destroyed at temperatures far below that at which any spinel-forming reaction could begin, so that the molded masses would be falling apart during a large portion of the firing period of the furnace or kiln.

The present invention is distinguished broadly from such prior proposals in the fact that it involves the production of an initial bond at atmospheric temperatures by the use of an hydraulic cement having a high content of alumina, and also includes in the original mixture a large proportion of free magnesia (supplied by the calcined magnesite) or other free protoxide which can combine pyrochemically at furnace temperatures with the alumina of the cement (which is a sesquioxide) to form a high temperature bond, which I believe results from a spinel-forming reaction between those two, though perhaps involving other constituents.

The technical and scientific literature of the past and present contains full information as to the characteristics of numerous classes of both natural and artificially made spinels, and as to methods of producing the latter, but no one, so far as I know, has heretofore adapted and utilized any of such processes (perfected to a degree which would render them practical) in the production by a simple operation of satisfactory fire bricks or furnace linings through the utilization of cheap and plentiful raw materials in a simple and thoroughly practical manner requiring but little time and the use of only ordinary furnace temperatures for their manufacture,—thereby economizing in fuel, labor and overhead charges to anything like the extent rendered possible by my present invention.

In carrying out my invention, I preferably mix by weight three parts of dead burned magnesite, or the same amount of sintered dolomite, with an equal quantity of crushed chromite ore and one part of quickly hardening hydraulic cement having a high content of alumina of the kind now used in highway construction. The particular form of hydraulic cement with the required high percentage of alumina hereinbefore mentioned which I prefer to use is one of the aluminous type commonly known as "calcium aluminate cement" or "fused cement" made by the complete fusion of impure bauxite and limestone. This is also particularly adapted for use in my invention because of its lower content of silica and of lime. Dolomite is a double carbonate of calcium and magnesium, the constituents of which are by sintering largely reduced to magnesia and lime. Raw magnesite is a natural magnesium carbonate ($MgCO_3$) containing various impurities, including usually 7% or 8% of iron oxide ($Fe_2O_3$). The heat to which the raw magnesite is subjected in the burning operation drives off nearly all the combined carbonic oxide, so that the "dead burned" commercial product I use by preference is practically magnesium oxide (MgO) mixed with such iron oxide and other original impurities. I prefer to have one-third by weight of the dead burned magnesite, or of the sintered dolomite, ground to 100 mesh, while the remaining two-thirds may run from 100 mesh up to half-inch particles in size. The chromite ore ($FeCr_2O_4$) is preferably used in the same condition as to fineness as is the magnesite or dolomite. While the above stated proportions produce the best results, the quantities of the magnesia-containing compound may be varied within wide limits according to special requirements, as stated in my before mentioned prior application, Ser. No. 648,644 of which this is in part a continuation.

Such ores obtainable in the market are usually mixtures of natural spinels, and chemical analyses of them show the proportions of their constituents to vary within about the following limits:

| | Percent |
|---|---|
| Chromium oxide | 40 –60 |
| Silica | 3.3– 8 |
| Ferrous oxide (FeO) | 0.0–17 |
| Alumina | 0.0–22 |
| Magnesia (MgO) | 0.0–15 |

This cement is, of course, all finely ground. The dry mix so formed I wet with enough water to render the mass plastic and then feed it to the ordinary brick machine, or other molding apparatus, or plaster it on the walls and bottom of the furnace to be lined, and thereafter allow the molded masses to set and harden for about eight hours, after which the forms or molds can be removed and the kiln or furnace fired in the usual way, the temperature being run up to 2300° Fahrenheit, or more, in from about 12 to 24 hours, if that degree of rapidity in operation is desirable. The product made according to the above described process is brown in color, hard, and tough in texture, will not be eroded or otherwise disintegrated by molten metal and slags and forms an ideal refractory as it will not crack, spawl nor otherwise disintegrate under furnace heat, nor melt until a temperature is attained many degrees higher than those ordinarily employed in standard metallurgical operations.

The setting of the cement produces a concrete body in which the coarse chromite and magnesite fragments are physically embedded as mineral aggregates, but the chemical process and the crystallization involved in the hydrating step of the cement leave the resultant alumina thereof and the very finely ground portions of magnesia and of chromite in close physical juxtaposition most favorable for further combinations and/or reactions, so that on the subsequent application of furnace heat such free magnesia and the free alumina derived from the dehydrated cement combine by pyro-chemical action to form, or at least initiate the formation of the well known magnesia-alumina spinel ($MgO.Al_2O_3$) which has often been made heretofore synthetically for other purposes.

Such spinel has a very high melting point and probably serves as a matrix or binder to physically surround and unite together the larger particles of chromite and of magnesite,—both of which latter may remain physically unchanged as they are inherently refractory. The very fine particles of ground chromite may, however, be more or less broken down so that their constituents may be included in any new combinations formed pyrochemically, but as they are already in the form of natural spinels, any such re-combination is doubtful. The larger fragments, if unchanged, contribute both to the ruggedness of the ultimate mass and its ability to resist high temperatures. Practical tests have shown, however, that the inclusion of a substantial proportion of the finely ground chromite is necessary to produce a satisfactory refractory mass. If only the magnesite, cement and coarse particles of chromite be used the product is coarser in texture and cracks and sprawls more or less at working furnace temperatures.

It has long been known that crushed chromite would form a satisfactory high temperature refractory if a suitable high temperature binder for it could be found, and the main advantage of the present invention arises from the fact that it apparently supplies such a binder.

Also it has been proposed to use high alumina cement as a binder for crushed chromite in the making of plastic furnace linings, and while linings so produced will stand working furnace temperatures without cracking or shrinking, they become quite soft under the higher furnace temperatures and therefore are much inferior to the linings produced by the present invention. As the chromium oxide, and any magnesia which may be present in the chromite ore as an impurity, exist therein as natural spinel combinations they are not free to further combine with the alumina of the cement when the newly formed lining is heated by firing the furnace, or the molded bricks or tiles are heated by firing the kiln. Consequently in the above mentioned prior procedure such alumina was, at most, merely sintered after the set cement had been dehydrated by prolonged exposure to the higher temperatures, and no strong new bond was then formed to take the place of that originally created by the hydration and setting of the cement. As a result such prior process resulted only in the formation of linings or bricks which were too soft for successful commercial use.

Bricks which have merely hardened by action of the hydraulic cement may also be used with a high temperature cement to build up a furnace lining and the spinel forming reaction will then also occur when the furnace is first fired to a sufficiently high temperature.

Tests of a lining for the combustion chamber of a water-tube boiler comprising material prepared in accordance with my present invention have shown that such material will withstand a flame temperature of about 3000° Fah. for an indefinite period of time without substantial cracking, spawling or softening thereof and melts only at temperatures several hundred degrees higher.

Having described my invention, I claim:

1. A process for preparing refractory linings for metallurgical furnaces and the like purposes characterized by mixing while dry chromite and calcined magnesite containing a relatively large quantity of free magnesia with calcium aluminate cement which contains a high percentage of alumina, sometimes called "fused" cement, the proportions being such that the magnesia content of the mixture shall be large enough to form a magnesia-spinel after combining with the alumina of the cement by pyrochemical action; transforming said mixture into solid form at atmospheric temperatures by adding water to hydrate the cement, whereby the finely divided particles of such cement and free magnesia are brought into intimate contact and physical cohesion one with another without the application of pressure to the mass and further hardening the so-solidified mass by heating it to working furnace temperatures of at least about 2300 degrees Fahrenheit sufficiently high to drive off the water of hydration and thereafter pyrochemically combine the alumina of the dehydrated cement with said magnesia.

2. A process such as defined in claim 1 in which said dry mixture is composed by weight of three parts of the chromite, about one-third of which is ground to a fineness of about 100 mesh while the remainder varies gradually in coarseness up to fragments not exceeding about one-half inch of maximum dimension; a like quantity of calcined magnesite in the same condition, and one part of said cement.

3. A mixture for refractory linings for furnaces and like purposes, characterized by the fact that a low temperature binding material comprising a hydraulic cement containing a high percentage of alumina of the type known as calcium aluminate cement, with chromite is mixed with a magnesium oxide compound in proportions such that the magnesia content of the mixture shall be large enough after the addition of water for hydration of said cement, to form by pyrochemical action under furnace temperatures of at least about 2300 degrees Fahrenheit, a magnesia-alumina spinel.

4. A dry mixture for use in forming refractory linings for furnaces according to claim 3 in which there are present equal quantities by weight of the chromite and the magnesium oxide compound ground to at least 100 mesh, and a quantity of cement of about the same weight.

5. A dry mixture for use in forming refractory linings for furnaces when wet with water comprising a hydraulic cement containing a high percentage of alumina of the type known as calcium aluminate cement, about three times as much of crushed chromite, by weight, one third of which will pass a 100 mesh screen, and a like weight of calcined magnesite in the same physical condition.

6. A refractory mass suitable for use in furnace linings and for similar purposes derived from a pyrochemical combination of substantially equal parts of chromite and calcined magnesite with a minor but considerable portion of calcium aluminate cement containing a high percentage of alumina and which will withstand a flame temperature of about 3000° Fahrenheit for an indefinite period of time without substantial cracking, spawling, or softening and melts at about 3200° Fahrenheit.

7. A refractory composition derived from a hydrated set concrete mass which comprises substantially equal parts of crushed chromite and thoroughly sintered magnesite with a minor but considerable portion of calcium aluminate cement made plastic with water and heat treated to working furnace temperatures of at least 2300° Fahrenheit.

JOHN M. KNOTE.